UNITED STATES PATENT OFFICE.

ALBERT BAUR, OF GISPERSLEBEN, NEAR ERFURT, ASSIGNOR TO THE SOCIETY FABRIQUES DE PRODUITS CHIMIQUES DE THANN ET DE MULHOUSE, OF THANN, GERMANY.

ARTIFICIAL MUSK AND PROCESS OF MAKING THE SAME.

SPECIFICATION forming part of Letters Patent No. 481,685, dated August 30, 1892.

Application filed March 7, 1892. Serial No. 424,067. (No specimens.) Patented in France August 5, 1891, No. 215,355; in Belgium August 5, 1891, No. 95,915; in Italy August 10 1891, No. 30,243, and in England August 12, 1891, No. 13,613.

*To all whom it may concern:*

Be it known that I, ALBERT BAUR, of Gispersleben, near Erfurt, Germany, have invented a new and useful Improvement in the Manufacture of Artificial Musk, (for which I have obtained Letters Patent in France, No. 215,355, dated August 5, 1891; in Belgium, No. 95,915, dated August 5, 1891; in Great Britain, No. 13,613, dated August 12, 1891, and in Italy, No. 30,243, dated August 10, 1891,) which improvement is fully set forth in the following specification.

I have already obtained two American patents, the first dated December 10, 1889, No. 416,710, and the second dated May 5, 1891, No. 451,847, for the manufacture of artificial musk. The process consisted in treating, by a mixture of nitric and sulphuric acid, the hydrocarbon, boiling from 170° to 200° centigrade, obtained by the reaction of chloride (bromide or iodide) of isobutyl on toluene in the presence of chloride of aluminium. The nitro derivative thus prepared formed yellowish-white crystals having a strong smell of musk. The scientific investigation of this reaction to which I have been devoting my attention has proved that the hydrocarbon, boiling from 170° to 200°, was a mixture of a great many constituents, the principal one being butyltoluene, the others butylbenzine, butylxylene, butylethylbenzine, and the corresponding amylic compounds, and finally, but in a smaller proportion, the corresponding propylic derivatives.

The xylene and ethylbenzine derivatives owe their formation to the xylene and ethylbenzine always contained in the toluene of commerce. On the other hand, they are formed also by the toluene itself, this substance being transformed partially by the action of chloride of aluminium into benzine, xylene, ethylbenzine, and other hydrocarbons. (*Vide* Friedel and Crafts *Comptes rendus de l'Academie des Sciences de Paris.*—Vol. 101, p. 1218.) The propylic and amylic compounds are derived from the corresponding alcohols, always contained in butylic alcohol of commerce.

I have prepared in a state of purity all these bodies, and I have found that by treatment with nitric and sulphuric acid they yield all musk-smelling nitro derivatives. The latter differ in their properties very little, and in no essential point from the nitro derivative of butyltoluene. The trinitrobutyltoluene, especially the odor of the propylic derivative, is a very weak one.

The butyltoluene is the tertiary compound

Under the influence of the chloride of aluminium the chloride of isobutyl transforms itself into the pseudobutylic derivative. The principal constituent of the artificial musk trinitro tertiary butyltoluene,

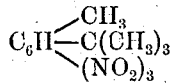

forms yellowish-white needles, melting at 96° to 97°.

It seems that all the trinitro derivatives of the aromatic hydrocarbons of the general formula

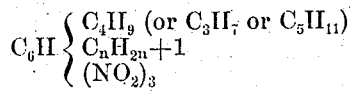

have a musky smell, and that even the last atom of hydrogen may be replaced by an alcoholic radicle, for

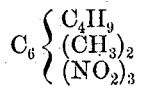

is also a substance that smells like musk. I have found, further, that all compounds in which this last atom of hydrogen is replaced by an etherificated hydroxylic group possess also a musky odor. These new compounds, whose general formula is

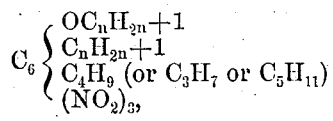

are no longer simple homologues of those for which I have obtained my anterior patents, and I therefore apply for a new patent to protect the same.

Butylanisol,

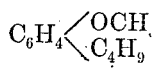

when nitrated gives a substance in which the smell of musk is hardly perceptible, and the nitro derivatives of the butylated para and orthocresolethers do not offer any remarkable property. Thus the nitro derivatives of the butylated, amylated, and propylated metacresolethers, and in general of the metasubstitute phenol-ethers smell like musk, and I shall describe their preparation in the following lines. I mix, for instance, one hundred parts of the methylic ether of metacresol with fifty parts of chloride of iso or pseudo butyl and six parts of chloride of aluminium, and I heat on the water-bath until no more hydrochloric acid is evolved—i. e., about twenty-four hours. In the place of chloride of aluminium, chloride of iron or another equivalent substance may be used. The product of the reaction is poured in water, distilled with steam and the butylated cresolether isolated by fractional distillation. It forms an aromatically-smelling, colorless liquid, boiling at 222° to 224°.

If in place of pure butylic chloride the derivative of commercial butylic alcohol is used, I obtain a mixture of butylic, propylic, and amylic ethers, boiling between 200° and 240°.

In order to obtain the musk substitute, the ether is introduced gradually in a large quantity of fuming nitric acid or in a mixture of nitric and sulphuric acid and heated on the water-bath until a sample poured in water solidifies. The whole product is then poured in water or on ice, filtered, washed, to eliminate the acid, and recrystallized from alcohol or another solvent. By this way I obtain yellowish-white needles possessing a strong musky odor.

Instead of butylic chloride, amylic or propylic chlorides may be used in the preparation of the substituted phenolether. It is also possible to obtain them by acting on other phenolethers with amylene, butylene, or propylene in presence of chloride of aluminium. The propyl cresolether

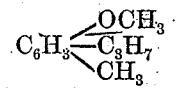

boils from 100° to 200°, the amylic derivative

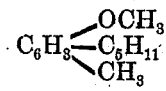

from 235° to 240°. The nitration is the same as described above. I can, finally, also prepare substances of the above-mentioned composition by introducing first the butylic, propylic, or amylic radicle into metacresol, nitrating the butyl (amyl or propyl) cresol thus obtained by means of nitric or nitric and sulphuric acid, and transforming the nitro derivatives into their ethers by the usual methods; or I may prepare first the ethers of the above-mentioned butylated, &c., metacresol and nitrate the same afterward.

Having now fully described my invention, what I claim is—

1. The described process of obtaining a substitute for musk by mixing an ether of metacresol or other substituted phenols with metallic chloride, heating, mixing with water, and isolating the butylated cresolether, thereby obtaining an aromatic, colorless liquid, introducing the ether into fuming nitric (or nitric and sulphuric) acid, heating and crystallizing from a suitable solvent, such as alcohol, as set forth.

2. The artificial musk herein described, being a trinitro-derivative of the butylated or analogous metacresol in a white crystalline form, characterized by the odor of natural musk, as set forth.

In witness whereof I have hereunto signed my name in the presence of two subscribing witnesses.

ALBERT BAUR.

Witnesses:
GEORGE GIFFORD,
CLARENCE H. GIFFORD.